United States Patent
Kobori

(10) Patent No.: US 7,089,759 B2
(45) Date of Patent: Aug. 15, 2006

(54) HEAT EXCHANGER, AND HEAT PUMP TYPE AIR CONDITIONING APPARATUS USING HEAT EXCHANGER

(75) Inventor: Yukitoshi Kobori, Sano (JP)

(73) Assignee: Calsonic Kansei Corp., Tokyo (JP)

( * ) Notice: Subject to any disclaimer, the term of this patent is extended or adjusted under 35 U.S.C. 154(b) by 0 days.

(21) Appl. No.: 10/951,933

(22) Filed: Sep. 28, 2004

(65) Prior Publication Data

US 2005/0097919 A1 May 12, 2005

(51) Int. Cl.
*F25B 39/04* (2006.01)
(52) U.S. Cl. .................................. 62/506; 62/324.1
(58) Field of Classification Search ............... 62/506, 62/509, 324.1, 332, 391; 165/154
See application file for complete search history.

(56) References Cited

U.S. PATENT DOCUMENTS 4,224,805 A * 9/1980 Rothwell ...................... 62/260
5,072,593 A * 12/1991 Van Steenburgh, Jr. ........ 62/77
5,586,437 A * 12/1996 Blecher et al. ............... 62/47.1
5,706,666 A * 1/1998 Yamanaka et al. ............ 62/225
6,279,649 B1 * 8/2001 Osakabe ................. 165/104.33

FOREIGN PATENT DOCUMENTS

JP  2002-98430  4/2002

* cited by examiner

*Primary Examiner*—Melvin Jones
(74) *Attorney, Agent, or Firm*—Brenda O. Holmes; Kilpatrick Stockton LLP

(57) ABSTRACT

The present invention provides a heat exchanger capable of circulating a given amount of refrigerant without being affected by an operation state of a heat pump cycle. The heat exchanger comprises a liquid chamber in which liquid is stored, and a refrigerant chamber disposed in the liquid chamber. The heat exchanger also comprises a liquid supply port for supplying the liquid to the liquid chamber, a liquid discharge port for discharging the liquid in the liquid chamber, a refrigerant supply port for supplying the refrigerant to the refrigerant chamber, and a refrigerant discharge port for discharging the refrigerant in the refrigerant chamber. A liquid refrigerant storing section having a predetermined capacity in the refrigerant chamber and storing the liquid refrigerant is formed in the heat exchanger.

4 Claims, 3 Drawing Sheets

HEAT EXCHANGER, AND HEAT PUMP TYPE AIR CONDITIONING APPARATUS USING HEAT EXCHANGER

BACKGROUND OF THE INVENTION

The present invention relates to a heat exchanger in which two different mediums come into contact with different duct walls to exchange heat, and the present invention also relates to a heat pump type air conditioning apparatus using the heat exchanger.

Conventionally, heat of a refrigerant which is heated utilizing a heat pump cycle is transmitted to liquid such as water through a heat exchanger, and the heated water is utilized as a heat source. For example, a heat pump cycle disclosed in Japanese Patent Application Laid-open No. 2002-98430 includes a first high-pressure side heat exchanger and a second high-pressure side heat exchanger, and the second high-pressure side heat exchanger exchanges heat between a high pressure refrigerant which flows out from the first high-pressure side heat exchanger and a second fluid with a lower temperature than that of a first fluid which exchanges heat in the first high-pressure side heat exchanger. A quantity of heat that can be taken out is equal to a sum of a quantity of heat that can be taken out by the first high-pressure side heat exchanger and a quantity of heat that can be taken out by the second high-pressure side heat exchanger. Therefore, the quantity of heat (enthalpy) that can be taken out by the heat pump is reduced, and coefficient of performance COP of the heat pump can be prevented from being deteriorated.

SUMMARY OF THE INVENTION

According to the heat exchanger which is disposed in such a conventional heat pump cycle and which exchanges heat between a refrigerant and liquid, when a temperature difference between the refrigerant and the liquid is great, the refrigerant amount is largely reduced, and there is an adverse possibility that the refrigerant which circulates through the cycle becomes insufficient, and the cycle efficiency is deteriorated.

The present invention provides a heat exchanger capable of having a constant amount of refrigerant to circulate without being affected by an operation state of a heat pump cycle.

According to one technical aspect of the present invention, the heat exchanger comprises: a refrigerant chamber which is included in a refrigerant path and which includes a refrigerant supply port for supplying a refrigerant to the refrigerant chamber and a refrigerant discharge port for discharging out the refrigerant in the refrigerant chamber; and a liquid chamber which is included in a fluid path and which is disposed such as to surround the refrigerant chamber and is thermally connected to the refrigerant chamber, and which includes a liquid supply port for supplying the fluid and a liquid discharge port for discharging out the fluid in the liquid chamber, and a storing section for storing a liquid phase refrigerant is formed in the refrigerant chamber.

DESCRIPTION OF THE PREFERRED EMBODIMENTS

Figure 1:
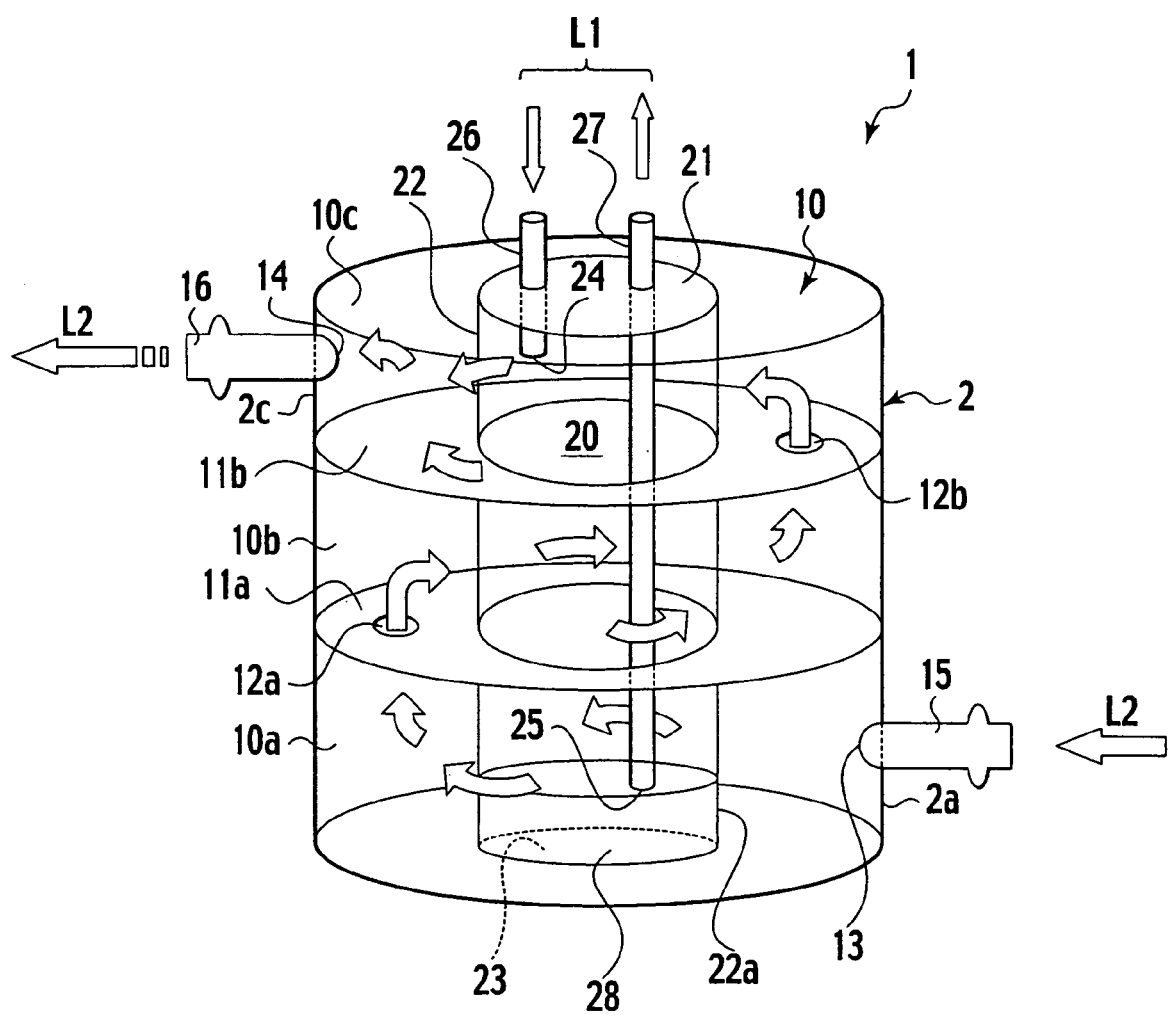
FIG. 1 is a perspective view showing an internal configuration of a heat exchanger according to the present invention.

One embodiment of the present invention will be explained in detail with reference to the accompanying drawings. FIG. 1 is a perspective view showing an internal configuration of a heat exchanger according to the present invention.

As shown in FIG. 1, a heat exchanger 1 of an embodiment is formed into a substantially cylindrical shape by an outer peripheral wall 2. The heat exchanger 1 includes a liquid chamber 10 provided inside the outer peripheral wall 2. Water as fluid is stored in the liquid chamber 10. A refrigerant chamber 20 which stores carbonic acid gas as a refrigerant is concentrically provided inside the liquid chamber 10. The liquid chamber 10 is included in a path L2 of the fluid. The refrigerant chamber 20 is included in a later-described path L1 (L1a) of the refrigerant. That is, the liquid chamber 10 surrounds the refrigerant chamber 20, the liquid chamber 10 and the refrigerant chamber 20 are thermally connected to each other and heat is transmitted therebetween. As a result, heat is exchanged between the fluid in the path L2 and the refrigerant in the path L1.

The liquid chamber 10 has division walls 11a, 11b which divide the liquid chamber 10 along a center axial direction thereof into a first liquid chamber 10a, a second liquid chamber 10b and a third liquid chamber 10c from a lower portion of the liquid chamber 10 in this order. The division walls 11a, 11b are respectively provided with duct holes 12a, 12b through which liquid flows.

The first liquid chamber 10a as a lower portion of the liquid chamber 10 has an outer peripheral wall 2a. The outer peripheral wall 2a is formed with a liquid supply port 13. Water from outside is supplied into the heat exchanger 1 through the liquid supply port 13. The third liquid chamber 10c as an upper portion of the liquid chamber 10 has an outer peripheral wall 2c. The outer peripheral wall 2c is formed with a liquid discharge port 14 through which water in the heat exchanger 1 is discharged outside.

Water which is supplied from outside into the first liquid chamber b1a through the liquid supply port 13 is supplied to the second liquid chamber 10b through the duct hole 12a. The water supplied to the second liquid chamber 10b is supplied to the third liquid chamber 10c through the duct hole 12b. The water supplied to the third liquid chamber 10c is discharged outside through the liquid discharge port 14. The duct hole 12a is formed on the opposite side from the liquid supply port 13 with respect to the center axis. The duct hole 12b is formed on the opposite side from the liquid discharge port 14 with respect to the center axis.

The refrigerant chamber 20 has a predetermined capacity in accordance with a capacity of the liquid chamber 10. The refrigerant chamber 20 is separated from the liquid chamber 10 by a heat-exchange wall 22 having a predetermined surface area. A refrigerant supply pipe 26 passes through an upper surface 21 of the refrigerant chamber 20. The refrigerant supply pipe 26 is provided at its one end portion with a refrigerant supply port 24 through which a refrigerant is supplied into the refrigerant chamber 20 from outside. The refrigerant supply pipe 26 is held such that the refrigerant supply port 24 is located at a predetermined position.

A refrigerant discharge pipe 27 passes through the upper surface 21 of the refrigerant chamber 20. The refrigerant discharge pipe 27 is provided at its one end portion with a refrigerant discharge port 25 through which a refrigerant is discharged outside from the refrigerant chamber 20. The refrigerant discharge pipe 27 is held such that the refrigerant discharge port 25 is located at a predetermined position at a predetermined height L from a bottom surface 23.

Since the refrigerant discharge port 25 is held at the predetermined position, a predetermined capacity is defined by the bottom surface 23 and a side wall 22a of the refrigerant chamber 20 from the bottom surface 23 to the predetermined height L. As a result, a liquid refrigerant storing section 28 which stores supercritical phase refrigerant as a liquid refrigerant is formed.

In the heat exchanger 1 of this embodiment, the water as fluid is supplied to the first liquid chamber b1a from the liquid supply pipe 15 through the liquid supply port 13, and supplied from the first liquid chamber 10a to the second liquid chamber 10b through the duct hole 12a, and supplied from the second liquid chamber 10b to the third liquid chamber 10c through the duct hole 12b. Then, the water is discharged from the third liquid chamber 10c to the liquid discharge pipe 16 through the liquid discharge port 14. The water is heated by the refrigerant through the heat-exchange wall 22 between the instant when the water is supplied to the heat exchanger 1 and the instant when the water is discharged.

In the heat exchanger 1 of this embodiment, the carbonic acid gas as the refrigerant is used such that the carbonic acid gas is changed in phase between the supercritical phase and the vapor phase.

The carbonic acid gas is supplied in its vapor phase state from the refrigerant supply pipe 26 to the refrigerant chamber 20 through the refrigerant supply port 24, and heat is radiated to the water through the heat-exchange wall 22 so that the phase of the carbonic acid gas is changed to the supercritical phase, and the carbonic acid gas drops into the refrigerant chamber 20 through the heat-exchange wall 22. The supercritical phase refrigerant drops into the refrigerant chamber 20 and is stored in the liquid refrigerant storing section 28. If this refrigerant is accumulated up to the refrigerant discharge port 25, the refrigerant is discharged out from the refrigerant discharge port 25 through the refrigerant discharge pipe 27 by a pressure of the vapor phase refrigerant.

The water supplied to the liquid chamber 10 is supplied upward while being heated. The vapor phase refrigerant supplied from the upper portion of the refrigerant chamber 20 dissipates heat and its phase is changed into the supercritical phase, and the refrigerant is stored in the liquid refrigerant storing section 28. With this configuration, the water with a low temperature is heated by the supercritical phase refrigerant, the heated water is further heated by the vapor phase refrigerant at a high temperature, and the temperature of the water is increased efficiently.

Second Embodiment

Figure 2:
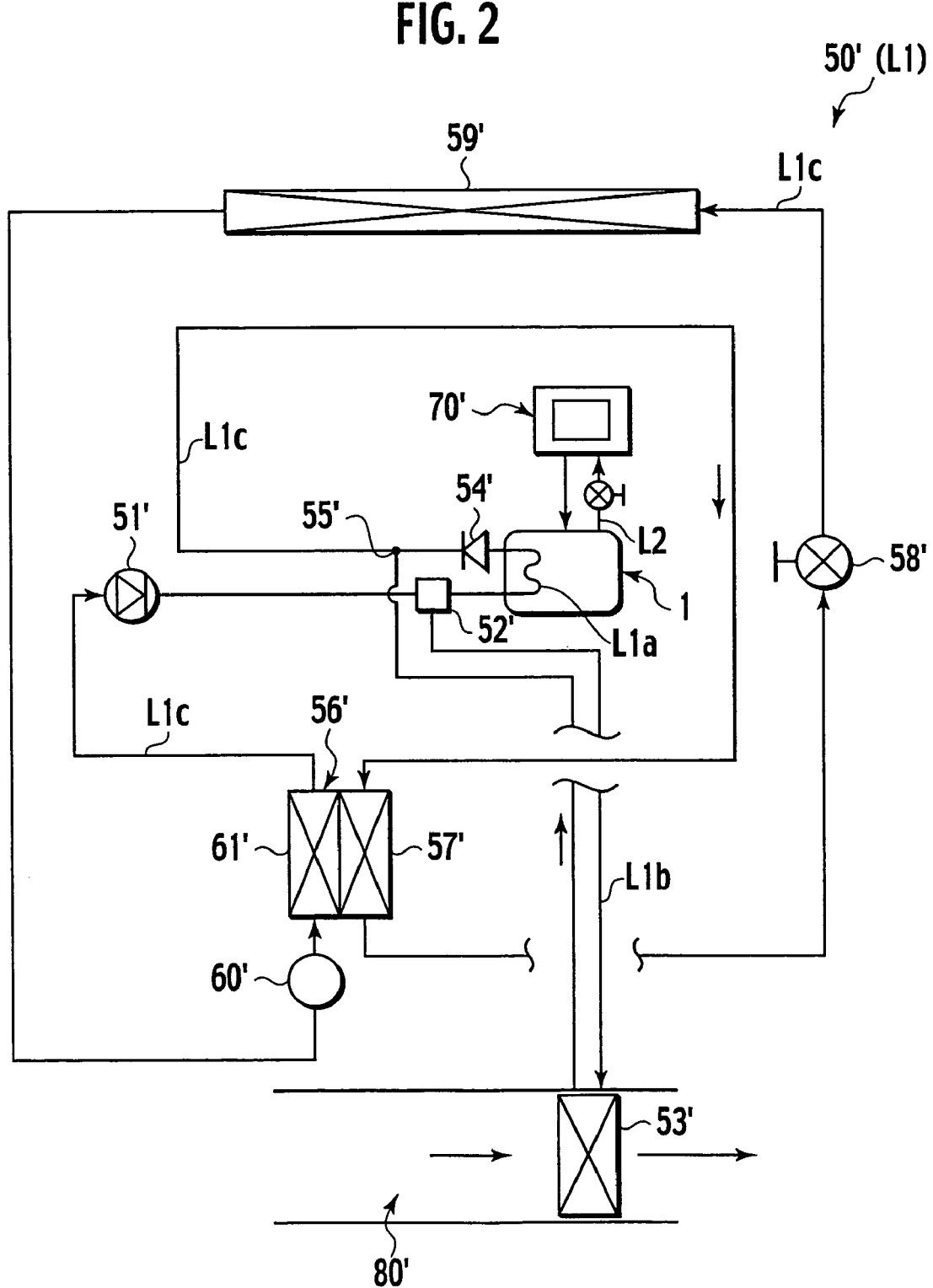
FIG. 2 is a block diagram in a case where the heat exchanger according to one embodiment is applied to a heat pump cycle of a vehicle using a fuel cell as a power source.

A case where the heat exchanger 1 of this embodiment is applied to a heat pump cycle will be explained next with reference to the drawings. FIG. 2 shows a configuration in which the heat exchanger 1 of the embodiment is applied to a heat pump cycle 50' for a vehicle using a fuel cell as a power source (energy source). The heat pump cycle 50' has three operating modes and can switch between the three modes according to need, and can operate in that mode. The three operating modes include (1) a heating mode for heating air sent into a passenger room as heating means of the air conditioning apparatus which adjust a temperature in the passenger room, (2) a defrosting mode for defrosting by heating and circulating water in a stack 70' of the fuel cell as the power source in a case where the water in the stack 70' is frozen, and (3) a heating and defrosting mode in which the heating mode and the defrosting mode are carried out together.

In the heat pump cycle 50' of this embodiment, a vapor phase refrigerant compressed to a high temperature and to a high pressure by a compressor 51' is supplied to a cross valve 52'. In the cross valve 52', pipes are arranged such that the following three modes can be switched: (1) the heating mode in which the vapor phase refrigerant is supplied only to a heater core 53' in accordance with the operating mode of the heat pump cycle 50', (2) the defrosting mode for supplying the vapor phase refrigerant only to the heat exchanger 1, and (3) the heating and defrosting mode for supplying the vapor phase refrigerant to the heater core 53' and the heat exchanger 1.

That is, a first flow path L1a of refrigerant includes a cross valve 52', the heat exchanger 1 and a check valve 54'. A second flow path L1b of refrigerant includes the cross valve 52' and a heater core 53'. A common flow path of refrigerant includes a high-pressure side heat exchanging section 57', an expansion valve 58', an external heat exchanger 59', an accumulator 60', a low-pressure side heat exchanging section 61', the compressor 51', and the cross valve 52'. The first flow path L1a and the second flow path L1b of the refrigerant are bypass circuits which branch off from the common path L1c in the cross valve 52', and the first flow path L1a and the second flow path L1b can independently be selected.

In the heating mode, the second flow path L1b and the common path L1c are selected and the path L1 is constituted. First, a vapor phase refrigerant is compressed by the compressor 51' to a high temperature and to a high pressure, and is supplied to the cross valve 52'. The vapor phase refrigerant is supplied from the cross valve 52' to the heat exchanging section of the heater core 53', the vapor phase refrigerant passes through the heat exchanging section, and is sent to a merging section 55'. The heater core 53' is disposed in an air conditioner air passage 80'. Air conditioner air introduced into the air conditioner air passage 80' passes through the heat exchanging section of the heater core 53'. With this configuration, the air conditioner air is heated by the refrigerant.

The refrigerant which passes through the merging section 55' passes through the high-pressure side heat exchanging section 57' of an auxiliary heat exchanger 56' along the common path L1c, and is sent to an external heat exchanger 59' while being thermally expanded. The external heat exchanger 59' is disposed outside of the passenger room, and the refrigerant absorbs heat using the external heat exchanger 59'.

The refrigerant which passes through the external heat exchanger 59' is separated into a vapor phase refrigerant and a supercritical phase refrigerant by the accumulator 60', and only the vapor phase refrigerant is set to the low-pressure side heat exchanging section 61' of the auxiliary heat exchanger 56'. In the auxiliary heat exchanger 56', the refrigerant in the low-pressure side heat exchanging section 61' is heated by the refrigerant in the high-pressure side heat exchanging section 57'. The refrigerant which passes through the low-pressure side heat exchanging section 61' of the auxiliary heat exchanger 56' is sent to the compressor 51' and circulates through the heat pump cycle 50' (L1).

In the defrosting mode, the first flow path L1*a* and the common path L1*c* are selected to constitute the path L1. First, the vapor phase refrigerant compressed by the compressor 51' to a high temperature and a high pressure is supplied to the cross valve 52', the vapor phase refrigerant is supplied from the cross valve 52' to the refrigerant supply pipe 26 of the heat exchanger 1, the refrigerant passes through the refrigerant chamber 20 and is sent to the merging section 55'. Here, the pipes are arranged such that water discharged from the liquid discharge pipe 16 of the heat exchanger 1 is supplied to the stack 70' of the fuel cell, and the water discharged from the stack 70' is supplied to the liquid supply pipe 15 of the heat exchanger 1 and the water is circulated. Ice in the stack 70' is defrosted by the water heated by the heat exchanger 1.

The capacity change of the supercritical phase refrigerant which passed through the heat exchanger 1 is greater than that of the vapor phase refrigerant which passed through the heater core 53'. Therefore, the check valve 54' is provided between the merging section 55' and the refrigerant discharge pipe 27 so that the refrigerant does not flow reversely from the merging section 55' to the heat exchanger 1.

The refrigerant which passed through the merging section 55' passes through the high-pressure side heat exchanging section 57' of the auxiliary heat exchanger 56' along the common path L1*c* as in the heating mode, the refrigerant thermally expands in the expansion valve 58' and is sent to the external heat exchanger 59'. The external heat exchanger 59' is disposed outside of the passenger room, and the refrigerant absorbs heat from outside air in the external heat exchanger 59'.

The refrigerant which passed through the external heat exchanger 59' is separated into the vapor phase refrigerant and the supercritical phase refrigerant by the accumulator 60', and is sent to the low-pressure side heat exchanging section 61' of the auxiliary heat exchanger 56'. In the auxiliary heat exchanger 56', the refrigerant in the low-pressure side heat exchanging section 61' is heated by a refrigerant in the high-pressure side heat exchanging section 57'. The refrigerant which passed through the low-pressure side heat exchanging section 61' of the auxiliary heat exchanger 56' is sent to the compressor 51', and is circulated through the heat pump cycle 50' (L1).

In the heating and defrosting mode, the first flow path L1*a*, the second flow path L1*b* and the common path L1*c* are selected to constitute the path L1. The vapor phase refrigerant is supplied from the cross valve 52' to the heat exchanging section of the heater core 53' and the refrigerant supply pipe 26 of the heat exchanger 1, and the heating means and the defrosting mode are carried out simultaneously.

Third Embodiment

Figure 3:
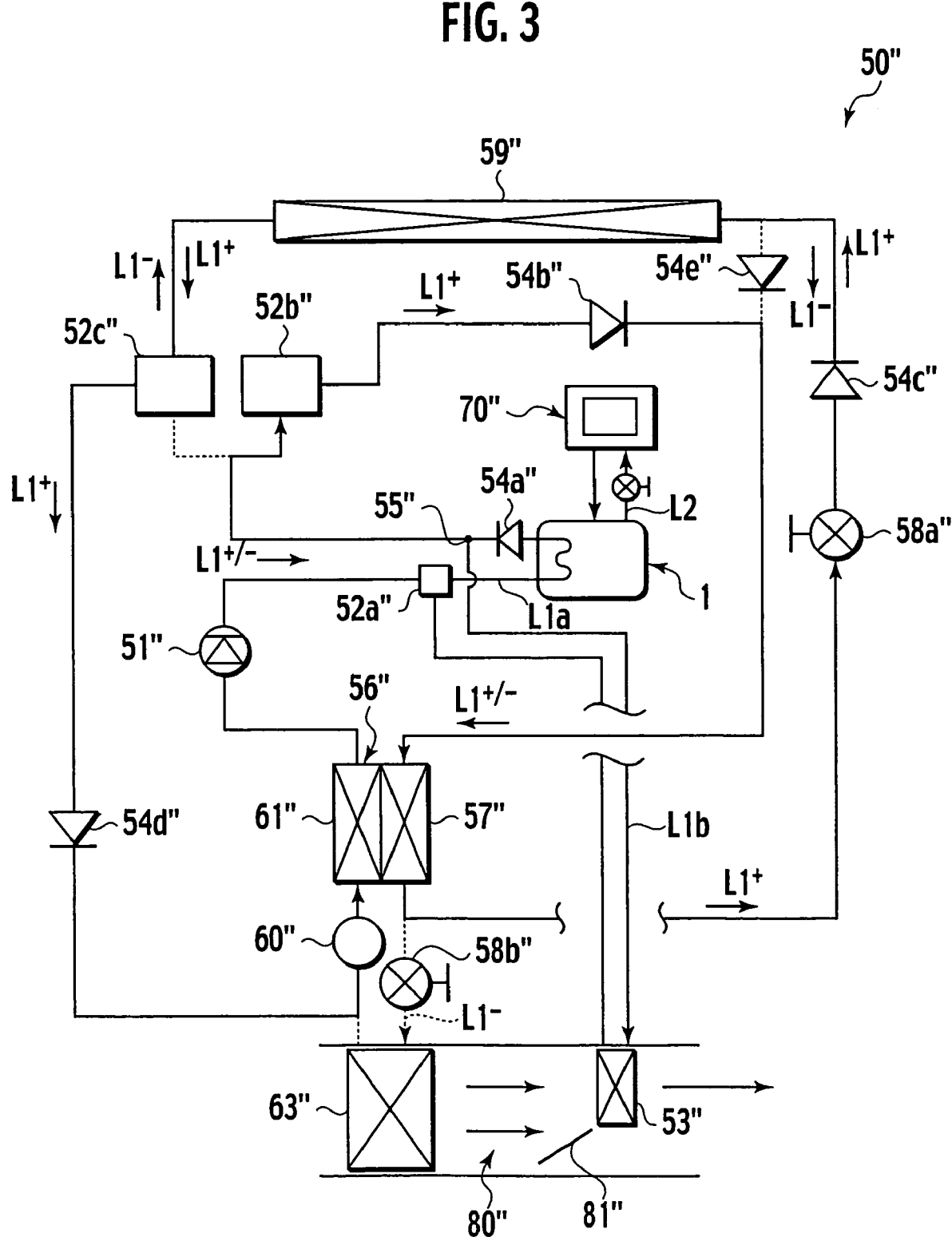
FIG. 3 is a block diagram in a case where the heat exchanger according to the embodiment is applied to a heat pump cycle that is different from that shown in FIG. 2.

A case in which the heat exchanger 1 of the embodiment is applied to another heat pump cycle will be explained. FIG. 3 shows a configuration when the heat exchanger 1 of the embodiment is applied a heat pump cycle 50" which uses a fuel cell as a power source. In the heat pump cycle 50", the following four operating modes can be switched optionally. That is, the four operating modes include (1) a heating mode for heating air conditioner air sent into the passenger room as heating means, (2) a defrosting mode in which when water in a stack 70" of the fuel cell which is the power source is frozen, water is heated and circulated in the stack 70" to defrost the ice, (3) a heating and defrosting mode for carrying out both the heating means and the defrosting mode, and (4) a cooling mode for cooling air conditioner air sent into the passenger room as cooling means of the air conditioning apparatus which adjust the temperature in the passenger room.

That is, the first flow path L1*a* of refrigerant includes a cross valve 52*a*", the heat exchanger 1 and a check valve 54*a*". The second flow path L1*b* of refrigerant includes the first cross valve 52*a*" and a heater core 53". The common path L1*c* of refrigerant in a first direction includes the second cross valve 52*b*", a second check valve 54*b*", a high-pressure side heat exchanging section 57', a first expansion valve 58*a*", a third check valve 54*c*", an external heat exchanger 59", a third cross valve 52*c*", a fourth check valve 54*d*", an accumulator 60", a low-pressure side heat exchanging section 61", a compressor 51", and a first cross valve 52*a*". The common flow path L1− of refrigerant in a direction opposite from the first direction includes the external heat exchanger 59", a fifth check valve 54*e*", the high-pressure side heat exchanging section 57", a second expansion valve 58*b*", an evaporator 63", the accumulator 60", the low-pressure side heat exchanging section 61", the compressor 51" and the first cross valve 52*a*". The first flow path L1*a* and the second flow path L1*b* of refrigerant are bypass circuits which branch off from the common path L1 in the first cross valve 52*a*" and can be independently selected.

In the heating mode, the first flow path L1*a* and the common path L1+ in the first direction are selected to constitute the path L1. First, the vapor phase refrigerant is compressed to a high temperature and a high pressure by the compressor 51", and supplied to the first cross valve 52*a*", and supplied from the first cross valve 52*a*" to the heat exchanging section of the heater core 53". The vapor phase refrigerant which passed through the heat exchanging section is sent to the merging section 55". Here, the heater core 53" is disposed in the air conditioner air passage 80', and if the air conditioner air introduced into the air conditioner air passage 80' passes through the heat exchanging section of the heater core 53", the air conditioner air is heated by the refrigerant.

The refrigerant which passed through the merging section 55" is sent to the high-pressure side heat exchanging section 57" through the second check valve 54*b*" by the second cross valve 52*b*" along the common path L1+ in the first direction. The refrigerant passes through the high-pressure side heat exchanging section 57" of the auxiliary heat exchanger 56" and thermally expands in the first expansion valve 58*a*", and is sent to the external heat exchanger 59" through the third check valve 54*c*". The external heat exchanger 59" is disposed outside of the passenger room, and the refrigerant absorbs heat from outside air when the refrigerant thermally expands in the external heat exchanger 59".

The refrigerant which passed through the external heat exchanger 59" is sent to the accumulator 60" through the fourth check valve 54*d*" by the third cross valve 52*c*", and is separated into the vapor phase refrigerant and the supercritical phase refrigerant, and only the vapor phase refrigerant is sent to the low-pressure side heat exchanging section 61" of the auxiliary heat exchanger 56'. In the auxiliary heat exchanger 56', a refrigerant in the low-pressure side heat exchanging section 61" is heated by a refrigerant in the high-pressure side heat exchanging section 57'. The refrigerant which passed through the low-pressure side heat exchanging section 61" of the auxiliary heat exchanger 56" is sent to the compressor 51" and is circulated through the heat pump cycle 50" (L1).

In the defrosting mode, both the second flow path L1b and the common path L1+ in the first direction are selected to constitute the path L1. First, a vapor phase refrigerant which is compressed to a high temperature and a high pressure by the compressor 51" is supplied tot heat exchanger first cross valve 52a", and supplied from the first cross valve 52a" to the refrigerant supply pipe 26 of the heat exchanger 1, and passes through the refrigerant chamber 20 and is sent to the merging section 55". In the heat exchanger 1, pipes are arranged such that water discharged from the liquid discharge pipe 16 of the heat exchanger 1 is supplied to the stack 70" of the fuel cell, and the water discharged from the stack 70" is supplied to the liquid supply pipe 15 of the heat exchanger 1 and the water is circulated. Ice in the stack 70" is defrosted by the water heated by the heat exchanger 1.

The capacity change of the supercritical phase refrigerant which passed through the heat exchanger 1 is greater than that of the vapor phase refrigerant which passed through the heater core 53'. Therefore, the check valve 54a" is provided between the merging section 55" and the refrigerant discharge pipe 27 so that the refrigerant does not flow reversely from the merging section 55" to the heat exchanger 1.

The refrigerant which passed through the merging section 55" passes through the high-pressure side heat exchanging section 57" of the auxiliary heat exchanger 56" along the common path L1+ as in the heating mode, the refrigerant thermally expands in the expansion valve 58a" and is sent to the external heat exchanger 59" through the third check valve 54c". The external heat exchanger 59" is disposed outside of the passenger room, and the refrigerant absorbs heat from outside air in the external heat exchanger 59".

The refrigerant which passed through the external heat exchanger 59" is sent to the accumulator 60" through the fourth check valve 54d" by the third cross valve 52c", and is separated into the vapor phase refrigerant and the supercritical phase refrigerant, and only the vapor phase refrigerant is sent to the low-pressure side heat exchanging section 61" of the auxiliary heat exchanger 56". In the auxiliary heat exchanger 56", a refrigerant in the low-pressure side heat exchanging section 61" is heated by a refrigerant in the high-pressure side heat exchanging section 57". The refrigerant which passed through the low-pressure side heat exchanging section 61" of the auxiliary heat exchanger 56" is sent to the compressor 51" and is circulated through the heat pump cycle 50" (L1).

In the heating and defrosting mode, the vapor phase refrigerant is supplied from the first cross valve 52a" to the heat exchanging section of the heater core 53' and the refrigerant supply pipe 26 of the heat exchanger 1, and the heating means and the defrosting mode are carried out simultaneously.

In the cooling mode, the second flow path L1b and the common path L1− in the second direction are selected to constitute the path L1. First, the vapor phase refrigerant compressed by the compressor 51' to a high temperature and a high pressure and supplied to the first cross valve 52a", and supplied from the first cross valve 52a" to the heat exchanging section of the heater core 53". The vapor phase refrigerant which passed through the heat exchanging section is sent to the merging section 55". The heater core 53" is disposed in the air conditioner air passage 80', and the air conditioner air introduced into the air conditioner air passage 80" passes through the heat exchanging section of the heater core 53". With this configuration, the air conditioner air is heated by the refrigerant.

An air-mix door 81" is disposed upstream from the air conditioner air passage 80" of the heater core 53". An amount of air conditioner air which bypasses the heater core 53" is determined by a position of the air-mix door 81", and the temperature of the air conditioner air is adjusted.

The refrigerant which passed through the merging section 55" is sent to the external heat exchanger 59" through the third cross valve 52c" along the second common path L1−. The refrigerant dissipates heat in the external heat exchanger 59', and the refrigerant is sent to the high-pressure side heat exchanging section 57' of the auxiliary heat exchanger 56" through the fifth check valve 54e". The refrigerant which passed through the high-pressure side heat exchanging section 57' is thermally expanded by the second expansion valve 58b" and in this state, the refrigerant is sent to the evaporator 63" disposed upstream from the air conditioner air passage 80" of the heater core 53". When the refrigerant supplied to the evaporator 63" is thermally expanded, the refrigerant absorbs heat from the air conditioner air introduced into the air conditioner air passage 80".

The refrigerant which passed through the evaporator 63" is sent to the accumulator 60", and separated into the vapor phase refrigerant and the supercritical phase refrigerant, and only the vapor phase refrigerant is sent to the low-pressure side heat exchanging section 61" of the auxiliary heat exchanger 56'. In the auxiliary heat exchanger 56", a refrigerant in the low-pressure side heat exchanging section 61" is heated by a refrigerant in the high-pressure side heat exchanging section 57". The refrigerant which passed through the low-pressure side heat exchanging section 61" of the auxiliary heat exchanger 56" is sent to the compressor 51" and is circulated through the heat pump cycle 50" (L1).

Effect of the Invention

With the above configuration, if the heat exchanger 1 is disposed in the heat pump cycle 50', 50", the liquid refrigerant storing section 28 which has the predetermined capacity in the refrigerant chamber 20 and which stores liquid refrigerant is formed. The predetermined amount of liquid refrigerant is stored in the refrigerant chamber 20. With this configuration, when the heat exchanger 1 is disposed in the heat pump cycle 50', 50", a constant amount of refrigerant which is to be supplied to the heat exchanger 1 and a constant amount of refrigerant which is to be discharged from the heat exchanger 1 can be circulated without being affected by the operation state of the heat pump cycle.

Even if heat is transmitted to water through the heat-exchange wall 22 of the refrigerant chamber 20 and the water is condensed, heat of liquid refrigerant with the relatively high temperature can be transmitted to the water, the heat transmitting efficiency of the heat exchanger 1 can be enhanced.

Further, water is supplied from the outer peripheral wall 2a which corresponds to the lower portion of the liquid chamber 10, and discharged from the outer peripheral wall 2c which corresponds to the upper portion of the liquid chamber 10. The liquid refrigerant storing section 28 is formed around the bottom surface 23 of the refrigerant chamber 20. With this configuration, heat of the condensed supercritical phase refrigerant can be transmitted to the low temperature water which has not yet heated, and heat of the vapor phase refrigerant can be transmitted to water with the relatively high temperature. Therefore, the heat transmitting efficiency can further be enhanced.

While the one liquid chamber 10 is provided with the one refrigerant chamber 20 in the heat exchanger 1 of this embodiment, the same effect can also be obtained even if one liquid chamber is provided with a plurality of refrigerant chambers. The heat transmitting efficiency between the refrigerant and water can be further enhanced.

Even if the refrigerant discharge pipe 27 is held by a surface other than the upper surface 21 of the refrigerant chamber 20, e.g., by the bottom surface 23, and the refrigerant discharge port 25 is held at a predetermined position, the same effect can be obtained.

Even if the phase of a refrigerant is changed not between the supercritical phase and the vapor phase but between the liquid phase and the vapor phase, the same effect can be obtained.

While the heat exchanger 1 according to the present invention is applied to the heat pump cycle constituting the air conditioning apparatus for a vehicle in this embodiment, the same effect can be obtained even if the heat exchanger 1 of the present invention is applied to a heat pump cycle constituting a water heater.

This application claims benefit of priority under 35USC §119 to Japanese Patent Applications No. 2003-338256, filed on Sep. 29, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A heat exchanger, comprising:
   a refrigerant chamber being included in a refrigerant path, the refrigerant chamber including a refrigerant supply port for supplying a refrigerant to the refrigerant chamber and a refrigerant discharge port for discharging out the refrigerant in the refrigerant chamber; and
   a liquid chamber being included in a fluid path and being disposed such as to surround the refrigerant chamber and to thermally connect to the refrigerant chamber, the liquid chamber including a liquid supply port for supplying the fluid and a liquid discharge port for discharging out the fluid in the liquid chamber, wherein
   a storing section for storing a liquid phase refrigerant is formed in the refrigerant chamber, and the refrigerant discharge port is positioned at a predetermined height as measured from a bottom surface of the refrigerant chamber.

2. The heat exchanger according to claim 1, wherein
   the liquid supply port is formed in a lower portion of the liquid chamber, and
   the liquid discharge port is formed in an upper portion of the liquid chamber.

3. A heat pump type air conditioning apparatus having a configuration which transmits heat of a refrigerant to a cooling fluid which cools a power source, the air conditioning apparatus comprising:
   a refrigerant chamber being included in a refrigerant path, the refrigerant chamber including a refrigerant supply port for supplying a refrigerant to the refrigerant chamber and a refrigerant discharge port for discharging out the refrigerant in the refrigerant chamber; and
   a liquid chamber being included in a cooling fluid path and being disposed such as to surround the refrigerant chamber and to thermally connect to the refrigerant chamber, the liquid chamber including a liquid supply port for supplying the cooling fluid and a liquid discharge port for discharging out the cooling fluid in the liquid chamber, wherein
   a storing section for storing a liquid phase refrigerant is formed in the refrigerant chamber.

4. The heat pump type air conditioning apparatus according to claim 3, wherein
   the liquid supply port is formed in a lower portion of the liquid chamber,
   the liquid discharge port is formed in an upper portion of the liquid chamber, and
   the refrigerant discharge port is positioned at a predetermined height as measured from a bottom surface of the refrigerant chamber such as to form the storing section.

\* \* \* \* \*

UNITED STATES PATENT AND TRADEMARK OFFICE
CERTIFICATE OF CORRECTION

PATENT NO.       : 7,089,759 B2
APPLICATION NO.  : 10/951933
DATED            : August 15, 2006
INVENTOR(S)      : Yukitoshi Kobori It is certified that error appears in the above-identified patent and that said Letters Patent is hereby corrected as shown below:

Title Page
Please add:

(30)            Foreign Application Priority Data
Sept. 29, 2003        (JP).........................P2003-338256

Signed and Sealed this

Twenty-third Day of October, 2007

JON W. DUDAS
*Director of the United States Patent and Trademark Office*